United States Patent

Kori et al.

[11] Patent Number: 5,899,580
[45] Date of Patent: *May 4, 1999

[54] METHOD AND APPARATUS FOR REDUCING A TRACKING DISPLACEMENT BETWEEN A PREVIOUSLY RECORDED AREA AND A POSTRECORDED AREA OF A SLANT TRACK

[75] Inventors: Teruhiko Kori; Ken Iizuka, both of Kanagawa; Masaki Oguro, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,032

[22] Filed: Feb. 7, 1997

Related U.S. Application Data

[63] Continuation of application No. 08/636,886, Apr. 24, 1996, abandoned, which is a continuation of application No. 08/282,549, Jul. 29, 1994, abandoned.

[30] Foreign Application Priority Data

Aug. 2, 1993 [JP] Japan ..................... 5-191339

[51] Int. Cl.$^6$ .................................................. H04N 5/911
[52] U.S. Cl. ........................... 386/113; 386/124; 360/18; 360/77.12
[58] Field of Search .......................... 360/13, 14.1, 14.2, 360/14.3, 19.1, 18, 27, 77.01, 77.12, 77.13, 77.14, 77.15; 386/85, 95, 96, 104, 113, 116, 124

[56] References Cited

U.S. PATENT DOCUMENTS

| 4,602,298 | 7/1986 | Nishitani et al. ................. 360/14.1 |
| 5,432,655 | 7/1995 | Nakamura et al. ................ 360/19.1 |

FOREIGN PATENT DOCUMENTS

| 0 476 767 | 3/1992 | European Pat. Off. . |
| 0 488 640 | 6/1992 | European Pat. Off. . |
| 0 533 462 | 3/1993 | European Pat. Off. . |
| 3733183 | 4/1988 | Germany . |
| 2 197 980 | 6/1988 | United Kingdom . |

*Primary Examiner*—Andrew L. Sniezek
*Attorney, Agent, or Firm*—Frommer Lawrence & Haug, LLP.; William S. Frommer

[57] ABSTRACT

A digital signal recording and/or reproducing apparatus and method can maintain a satisfactory continuity of a previously-recorded area and a postrecorded area by reducing a tracking displacement between the previously-recorded area and the postrecorded area. A signal from a playback amplifier (10) is supplied to a f1/f2 discriminating circuit (13), and a discriminated signal is supplied to a tracking information detector (14). A memory (15) is controlled by a system controller (100). Tracking information from the detector (14) is supplied to the memory (15) which independently memorizes tracking information signals of respective areas of a video signal, an audio signal, a subcode signal and an ITI signal. Tracking information signals of the respective areas memorized in the memory (15) are selected by a selector (16) formed of switches (16$_1$ to 16$_4$) and supplied to an averaging circuit (17). A tracking information signal averaged by the average circuit (17) is supplied to a servo circuit (8) which effects a tracking correction.

23 Claims, 4 Drawing Sheets

METHOD AND APPARATUS FOR REDUCING A TRACKING DISPLACEMENT BETWEEN A PREVIOUSLY RECORDED AREA AND A POSTRECORDED AREA OF A SLANT TRACK

This application is a continuation of application Ser. No. 08/636,886, filed on Apr. 24, 1996, which is a continuation of application Ser. No. 08/282,549, filed Jul. 29, 1994 both abandoned.

CROSS-REFERENCE TO RELATED APPLICATIONS

The present application relates to Japanese laid-open patent publication No. 04-089434 (corresponding EP laid-open patent publication No. 0561281) and Japanese laid-open patent publication No. 04-181577 (corresponding laid-open EP patent publication No. 0574917) assigned to the same assignee of this application.

BACKGROUND OF THE INVENTION

The present invention relates to a digital signal recording and/or reproducing apparatus for recording and/or reproducing digital video/audio signals, for example, by using slant tracks formed by a rotary head and a digital signal recording and/or reproducing method thereof.

There is a digital signal recording and/or reproducing apparatus for recording and/or reproducing digital video/audio signals by using slant tracks formed by a rotary head. Such digital signal recording and/or reproducing apparatus uses a recording format of one track shown in FIG. 1A of the accompanying drawings when digital video/audio signals are recorded and/or reproduced.

A rotary head (not shown) scans a magnetic tape in the direction shown by an arrow x in FIG. 1A. In accordance with the scanning direction of the rotary head, there are provided an information signal (ITI: insert and track information) area, an audio signal area, a video signal area and a subcode signal area within one track. Margins are provided at the head tracing starting portion and the head tracing ending portion, respectively. Further, there are provided margins between respective areas.

According to this recording format, the audio signal area, the video signal area and the subcode signal area are arranged such that a so-called postrecording can be effected in the above-mentioned areas independently. Specifically, a reference signal that is used as a reference timing signal to switch the respective areas is provided in the ITI area. Then, the postrecording of each area is carried out by setting the apparatus to the recording mode at a timing of each area on the basis of the reference signal.

However, in the digital signal recording and/or reproducing apparatus using slant tracks formed by the rotary head, it is difficult to obtain an accurate linearity of the slant track. Specifically, it is frequently observed that a slant track is shaped in S-letter configuration of a positive or opposite polarity as shown in FIG. 1B. In this case, if a recording apparatus and a reproducing apparatus are different in polarity of S-letter in slant track, there is then the risk that the recording apparatus and the reproducing apparatus are not compatible with each other in use.

In the digital signal recording and/or reproducing apparatus, a displacement between the rotary head and the slant track (tracking displacement) is constantly observed and the tracking is corrected by controlling the travel of the recording medium (magnetic tape) so that displacements of the whole slant track are averaged.

However, in the digital signal recording and/or reproducing apparatus, when the slant track, for example, is shaped in S letter as shown by a solid line in FIG. 1B and the scanning locus of the rotary head is shaped as an inverse S letter as shown by a dashed line in FIG. 1B, if the tracking is corrected so that the displacements of the whole track are averaged (as shown by a one-dot chain line in FIG. 1B), a positional relationship between the slant track and the scanning locus becomes as shown in FIG. 1B. FIG. 1B shows this positional relationship in a little exaggerated fashion.

In that case, if the postrecording of the subcode signal area is carried out, the subcode signal area is recorded at the position shown by a dashed hatching in FIG. 1B and a displacement a is generated in these tracking operations with the result that a continuity cannot be obtained.

SUMMARY OF THE INVENTION

In view of the aforesaid aspect, it is an object of the present invention to provide a digital signal recording and/or reproducing apparatus which can maintain a satisfactory continuity between a previously-recorded area and a postrecorded area by reducing a tracking displacement between the previously-recorded area and the postrecorded area.

It is another object of the present invention to provide a digital signal recording and/or reproducing method which can maintain a satisfactory continuity between a previously-recorded area and a postrecorded area by reducing a tracking displacement between the previously-recorded area and the postrecorded area.

According to a first aspect of the present invention, there is provided a digital signal recording and/or reproducing apparatus which uses slant tracks formed by a rotary head, each of said slant tracks being divided into a plurality of areas, and which records and/or reproduces a digital signal independently provided at every area. The digital signal recording and/or reproducing apparatus comprises a circuit for generating tracking information of each area independently, a circuit for correcting a tracking by selectively using the tracking information, and a control circuit for correcting a tracking by using tracking information of a predetermined area provided near an arbitrary area when the arbitrary area of the areas is postrecorded and the arbitrary area is postrecorded.

In accordance with a second aspect of the present invention, there is provided a digital signal recording and/or reproducing method which uses slant tracks formed by a rotary head, each of the slant tracks being divided into a plurality of areas, and which records and/or reproduces a digital signal independently provided at every area. The digital signal recording and/or reproducing method comprises the steps of generating tracking information of each area independently, correcting a tracking by selectively using the tracking information, and correcting a tracking by using tracking information of a predetermined area provided near an arbitrary area when the arbitrary area of the areas is postrecorded, and postrecording said arbitrary area.

DETAILED DESCRIPTION OF THE PREFERRED EMBODIMENT

In a digital signal recording and/or reproducing apparatus, a DC component is generated by adding arbitrary bits to every predetermined number of bits of a recording digital signal, the resultant DC component is controlled with a configuration of added bits, a low band signal having a desired characteristic is generated by the change of the DC component and tracking information is obtained by detecting the low band signal (see Japanese laid-open patent publication No. 4-255969).

Specifically, in the digital signal recording and reproducing apparatus, it is possible to change a DC component (DSV: digital sum value) of a digital signal of an arbitrary period by adding 1 bits at every 24 bits of a recording digital signal, for example, to +1 or −1. Therefore, the change of the DC component is controlled by bits to be added and a low band signal with a desired frequency characteristic (peak and dip) can be formed by the change of the DC component.

A peak or a dip can be given to a 1/60-frequency (f1) and a 1/90-frequency (f2) by controlling the bits to be added in response to a bit rate (clock frequency) of a recording digital signal. Accordingly, a low band signal in which a dip is given to the frequencies (f1) and (f2) is formed on every other track, and a low band signal in which a peak is given to the frequency (f1) or (f2) is formed on other remaining tracks.

When the rotary head scans the every other track, it is possible to obtain tracking information by judging a level difference by detecting crosstalk components of the frequencies (f1) and (f2) from the adjacent tracks. In this way, the digital signal recording and/or reproducing apparatus can obtain tracking information on the whole of the slant tracks.

The digital signal recording and/or reproducing apparatus according to the present invention includes a signal system configuration which will be described below with reference to FIG. 2.

Figure 2:
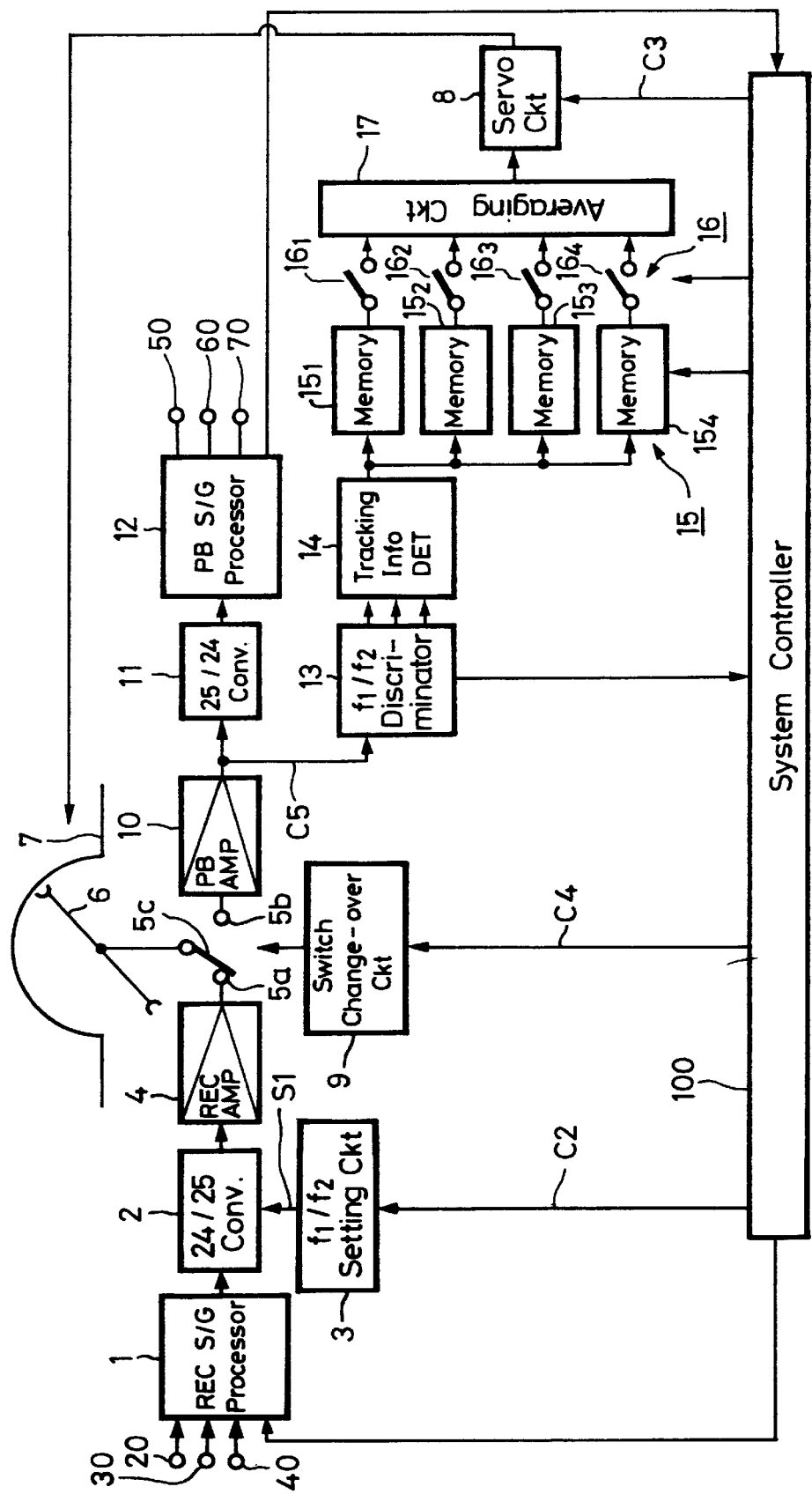
FIG. 2 is a schematic block diagram showing a digital signal recording and/or reproducing apparatus according to an embodiment of the present invention.

As shown in FIG. 2, an arbitrary video signal V, an arbitrary audio signal A and an arbitrary subcode signal S from signal sources (not shown) are supplied to input terminals 20, 30 and 40, respectively. The video signal V, the audio signal A and the subcode signal S applied to the input terminals 20, 30 and 40 are supplied to a recording signal processor 1 to which an information signal ITI from a system controller 100 also is supplied. A recording signal processed by the recording signal processor 1 is supplied to a 24/25 converter 2, in which it is converted in the form of 24-bit information word data to 25-bit channel word data. A signal C1 from a f1/f2 setting circuit 3 is supplied to the 24/25 converter 2 under the control of signal C2 from the system controller 100. Signal C1 is thereby processed to provide the above-mentioned low band signal. The output signal of the 24/25 converter 2 is amplified by a recording amplifier (REC AMP) 4 and supplied through a fixed contact 5a of a recording/playback change-over switch 5 to a rotary head 6 and thereby recorded on a magnetic tape 7.

A signal C3 from the system controller 100 is supplied to a servo circuit 8 which servo-controls the rotation of the rotary head 6 and the travel of the magnetic tape 7. A control signal C4 from the system controller 100 is supplied through a switch change-over circuit 9 to the recording/playback change-over switch 5 which therefore connects a movable contact 5c to the fixed contact 5a or 5b under the control of the control signal supplied thereto. In this way, the digital signal is recorded in the normal mode. A playback of the digital signal will be described below.

A recorded signal played back by the rotary head 6 from the magnetic tape 7 is supplied through a fixed contact 5b of the recording/playback change-over switch 5 to a playback amplifier (PB AMP) 10. A signal amplified by the playback amplifier 10 is supplied to a 25/24 converter 11, in which the 25-bit channel word data is reconverted into the 24-bit information word data. The data signal from the 25/24 converter 11 is supplied to a playback signal processor 12, in which it is processed to provide the video signal V, the audio signal A, and the subsignals. The video signal V, the audio signal A and the subcode signal S are supplied to output terminals 50, 60 and 70, respectively. The information signal ITI from the playback signal processor 12 is supplied to the system controller 100.

Furthermore, the signal from the playback amplifier 10 is supplied to a f1/f2 discriminating circuit 13, and a discriminated signal from the f1/f2 discriminating circuit 13 is supplied to a tracking information detector 14. A memory means 15 includes four memories $15_1$, $15_2$, $15_3$ and $15_4$. The memories $15_1$, $15_2$, $15_3$ and $15_4$ of the memory means 15 independently memorize tracking information signals of respective areas of the video signal V, the audio signal A, the subcode signal S and the information signal ITI in response to the tracking information signals supplied thereto from the tracking information detector 14 under the control of a control signal from the system controller 100.

A selector means 16 includes four switches $16_1$, $16_2$, $16_3$ and $16_4$ to select the tracking information signals of the respective areas memorized in the memories $15_1$, $15_2$, $15_3$ and $15_4$. The selected tracking information signals are supplied to an averaging circuit 17. The tracking information signal averaged by the averaging circuit 17 is supplied to the servo circuit 8 which effects the tracking control used when the digital signal is reproduced.

Therefore, in the normal playback mode, the selecting means 16 selects the tracking information signals of all areas and the averaging circuit 17 averages the tracking information signals of all areas of the track supplied thereto. Thus, when the averaged tracking information signal is used, a tracking can be corrected by controlling the transport of the recording medium (i.e., the magnetic tape 7) such that displacements of the whole of the slant track are averaged.

Operation of the digital signal recording and/or reproducing apparatus according to the present invention in the postrecording recording mode will be described below.

Initially, positions of respective areas of the video signal, the audio signal and the subcode signal along the head scanning direction on the track are determined by detecting the information signal ITI. Specifically, though not shown, the information signal ITI includes on a part thereof an SSA (start-sync (synchronizing) block area) formed of 61 sync signals with numerical values ranging from 0 to 60 affixed thereto. When a part of the SSA is reproduced from the information signal ITI, it is possible to accurately detect a relative positional relationship between the rotary head 6 and the recording signal by using the sync signal and the numerical value affixed to the sync signal.

Therefore, it is possible to accurately determine the position of each area by the calculation of the detected relative positional relationship. The video signal V, the audio signal A and the subcode signal S of the respective areas can accurately be rewritten in the postrecording mode by using the determined results.

Figure 3:
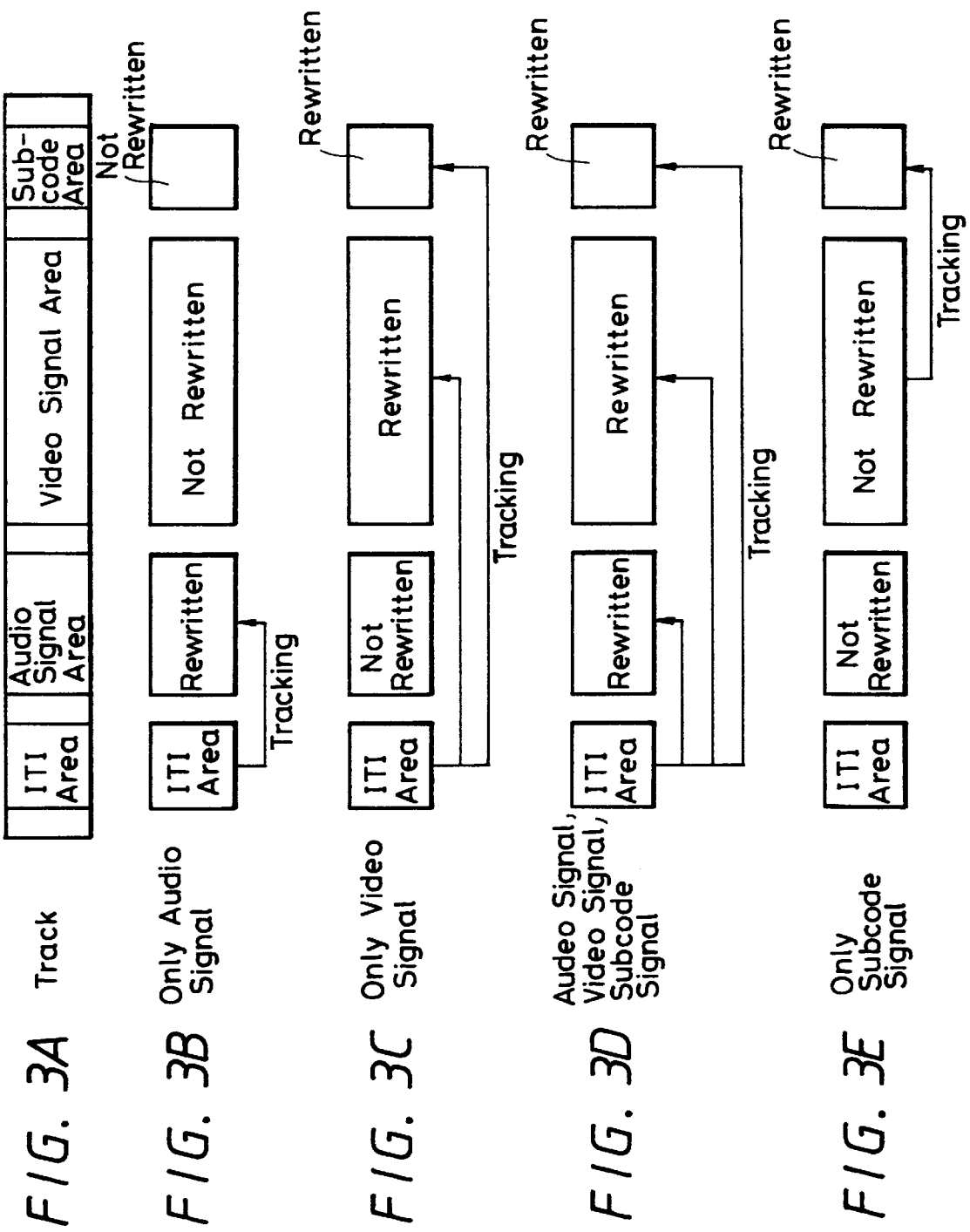
FIGS. 3A through 3E are schematic diagrams used to explain postrecording operation of the digital signal recording and/or reproducing apparatus shown in FIG. 2.

When only the audio signal A is recorded on the respective areas of the track shown in FIG. 3A in the postrecording mode, only the audio signal area is rewritten as shown in FIG. 3B. The tracking at that time is carried out by using the tracking information of the ITI area.

When only the video signal V is recorded on the respective areas of the track shown in FIG. 3A in the postrecording mode, the video signal area and the subcode area are simultaneously rewritten as shown in FIG. 3C. The tracking at that time is carried out by using the tracking information of the ITI area. Further, when the video signal V, the audio signal A and the subcode signal S are all recorded on the respective areas of the track shown in FIG. 3A in the postrecording mode, as shown in FIG. 3D, the audio signal area, the video signal area and the subcode signal area are rewritten. The tracking at that time is carried out by using the tracking information of the ITI area.

When only the subcode signal S is recorded on the respective areas of the track shown in FIG. 3A in the postrecording mode, as shown in FIG. 3E, only the subcode area is rewritten and the tracking at that time is carried out by using tracking information of the video area.

Operation of the digital signal recording and/or reproducing apparatus according to the present invention will be described more fully with reference to a flowchart of FIG. 4.

Figure 4:
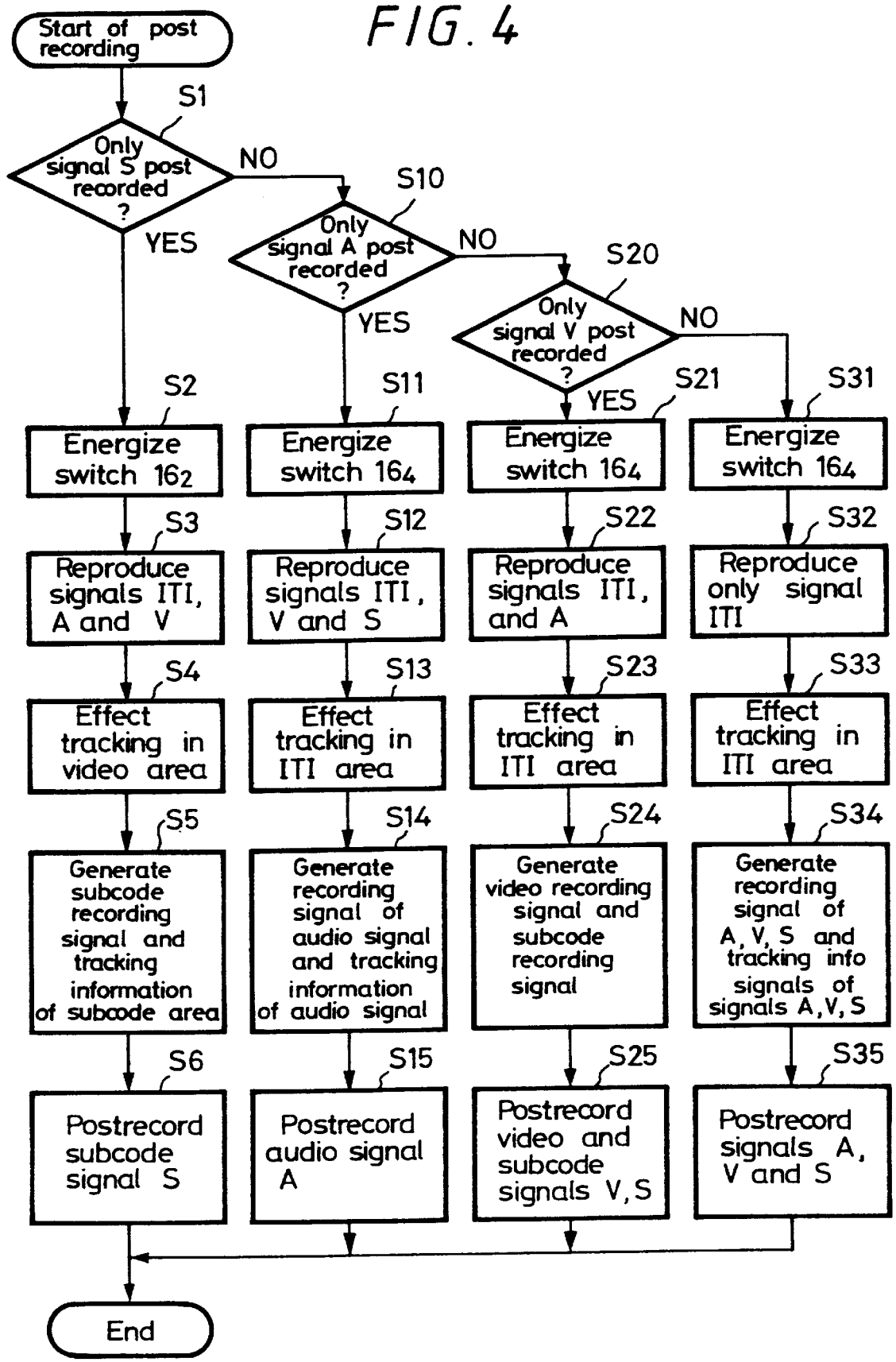
FIG. 4 is a flowchart to which reference will be made in explaining operation of the digital signal recording and/or reproducing apparatus shown in FIG. 2.

Referring to FIG. 4, following the start of postrecording, it is determined in decision step S1 whether or not only the subcode signal S should be postrecorded. If a YES is output at decision step S1, then the processing proceeds to step S2, whereat the switch $16_1$ of the selector means 16 is energized. Then, the information signal ITI, the audio signal A and the video signal V are reproduced at step S3. In the next step S4, the tracking is effected only in the video area. Then, a subcode recording signal is generated, and the tracking information of the subcode area is generated in step S5. In the next step S6, the postrecording of the subcode signal S is executed, and the processing is ended.

If the postrecording of only the subcode signal S is not determined as represented by a NO at decision step S1, then the processing proceeds to the next decision step S20. It is determined in decision step S10 whether or not the audio signal A should be recorded in the postrecording mode. If a YES is output at decision step S10, then the processing proceeds to step S11, whereat only the switch $16_4$ of the selector means 16 is energized. Then, the processing proceeds to the next step S12, whereat the information signal ITI, the video signal V and the subcode signal S are reproduced. In the next step S13, the tracking is carried out only in the ITI area, and the processing proceeds to the next step S14, whereat a recording signal of the audio signal is generated and tracking information of the audio area is generated. In the next step S15, the audio signal A is postrecorded, and the processing is ended.

If a NO is output at decision step S10, then the processing proceeds to the next decision step S20. It is determined in decision step S20 whether or not only the video signal V should be postrecorded. If a YES is output at decision step S20, then the processing proceeds to the next step S21, whereat the switch $16_4$ is energized in the ITI area. In the next step S22, the information signal ITI and the audio signal S are reproduced. Then, the tracking is carried out only in the ITI area at step S23. In the next step S24, a video recording signal and a subcode recording signal are generated. Also, tracking information signals of the video and subcode areas are generated. Then, the video and subcode signals V and S is postrecorded, and the processing is ended.

Further, if the postrecording of only the video signal V is not determined as represented by a NO at decision step S20, then it is determined that the postrecording of all signals of the audio signal A, the video signal V and the subcode signal S is executed. In step S31, the switch $16_4$ is energized only in the ITI area. Then, the signal on the ITI area is reproduced in step S32. In the next step S33, the tracking is carried out only in the ITI area. In the next step S34, audio, video and subcode recording signals are generated, and tracking information signals of the audio signal A, the video signal V and the subcode signal S are generated. In the next step S35, all of the audio signal A, the video signal V and the subcode signal S are postrecorded, and the processing is ended.

Figures 1A, 1B, 1C:
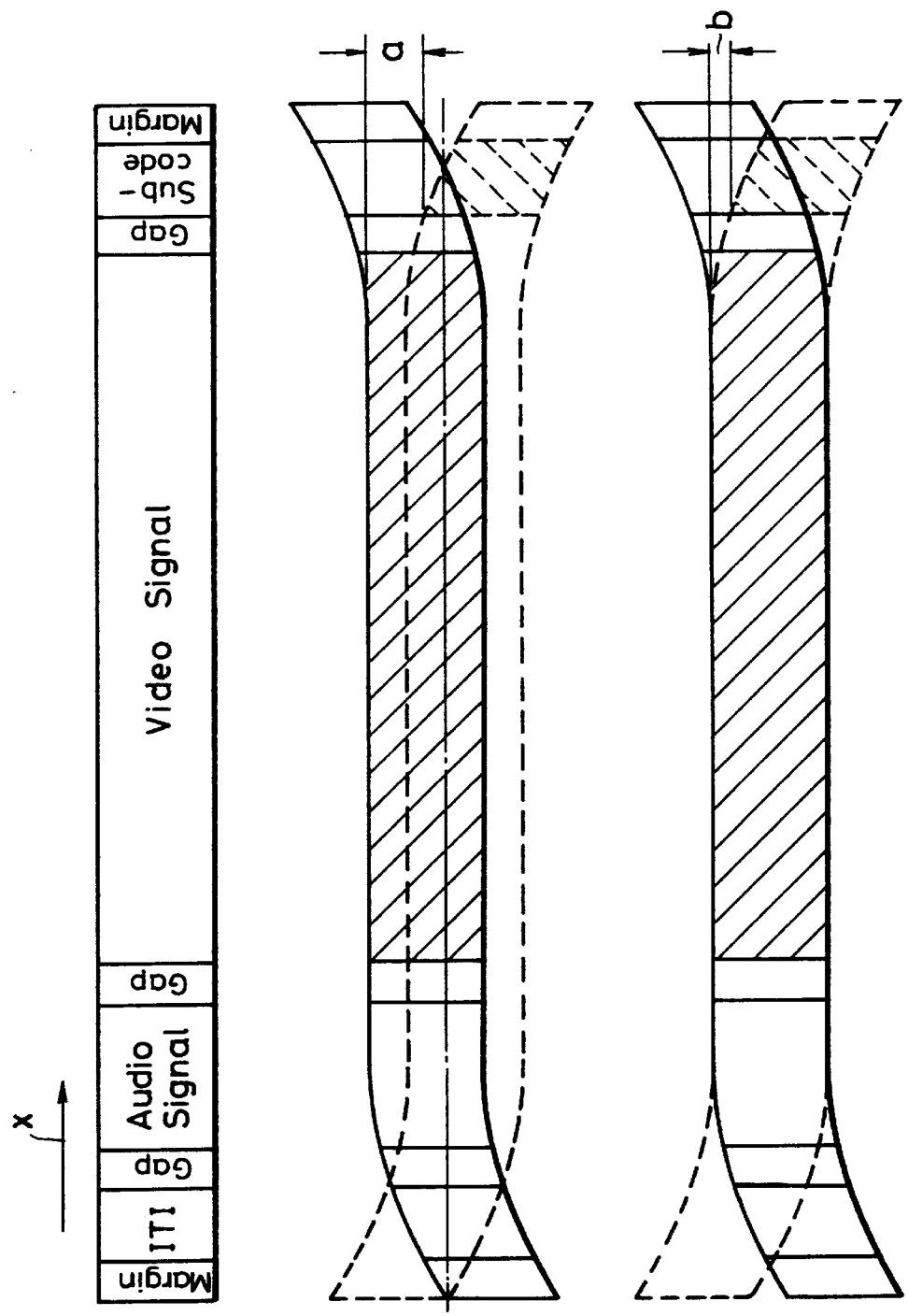
FIGS. 1A to 1C are a recording format and diagrams used to explain a tracking, respectively.

Therefore, according to the digital signal recording and/or reproducing apparatus of the present invention, when only the subcode signal S is postrecorded, the tracking is carried out only in the video area and the tracking information signal of the subcode area is generated, whereby the slant track and the scanning locus of the rotary head are brought in a positional relationship shown in FIG. 1C. Thus, the area of the subcode signal is recorded in the video signal area (shown hatched in FIG. 1C) at its position shown dashed lines, and a tracking displacement therebetween can be reduced as shown by b in FIG. 1C.

As described above, according to the digital signal recording and/or reproducing apparatus of the present invention, when an arbitrary area (subcode signal) is postrecorded, the tracking is corrected by using the tracking information of the predetermined area provided in the vicinity of the arbitrary area and then the postrecording is carried out, whereby the tracking displacement between the audio signal area and the other area can be reduced and a satisfactory continuity can be maintained.

According to the digital signal recording and/or reproducing apparatus, when the audio signal is postrecorded, the tracking is corrected by using the tracking information signal of the ITI area and then the postrecording is carried out. Thus, the tracking displacement between the audio signal area and the every other areas can be reduced and a satisfactory continuity can be maintained. In that case, although the tracking information signal of the audio signal area may be used, the tracking information signal of the audio signal area may not be used because the length of the audio signal area is short.

Having described a preferred embodiment of the invention with reference to the drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for recording/reproducing at least one slant track of a recording medium, said slant track including a plurality of recording areas arranged in a digital video format including an insert and track information area, an audio signal area, a video signal area and a subcode area, wherein at least one of audio signals, video signals and subcode information is recorded in respective recording areas during a postrecord mode after said recording areas are arranged in said digital video format on said recording medium, said plurality of recording areas having recorded therein respective tracking information signal, said apparatus comprising:

reproducing means for reproducing said respective tracking information signal from said plurality of recording areas arranged in said digital video format;

detecting means, in communication with said reproducing means, for detecting said respective tracking information signal recovered from said plurality of recording areas arranged in said digital video format to produce therefrom tracking information associated with any one of said recording areas;

memory means, in communication with said detecting means, for storing said tracking information associated with said respective recording areas arranged in said digital format;

selector means, in communication with said memory means, operable during said postrecord mode for selecting from said memory means any one of the tracking information stored in said memory means corresponding to signals to be recorded in a respective recording area during said postrecord mode; and control means, in communication with said reproducing means, with said detecting means, with said memory means, and with said selector means, for performing during said postrecord mode a tracking operation for recording to said any one of said recording areas in accordance with said tracking information selected by said selector means; said tracking information having been recorded in a recording area which is prior to said any one of said recording areas.

2. The apparatus of claim 1, wherein said control means corrects said tracking operation of said reproducing means in accordance with the tracking information associated with said insert and track information area when said audio signal area is postrecorded during said postrecord mode.

3. The apparatus of claim 1, wherein said control means corrects said tracking operation of said reproducing means in accordance with the tracking information associated with said insert and track information area when said video signal area and said subcode area are postrecorded during said postrecord mode.

4. The apparatus according to claim 1, wherein said slant track is S-shaped due to inaccurate linearity, and said control means corrects said tracking operation to record to the recording areas in the S-shaped slant track.

5. The apparatus according to claim 1, wherein said any one of the tracking information selected by said selector means is in the same slant track as said any one of said recording areas.

6. The apparatus according to claim 5, wherein said selector means selects the tracking information corresponding to the tracking information from a different recording area than said any one of said recording areas.

7. The apparatus according to claim 1, wherein said memory means comprises a plurality of memories for independently memorizing the tracking information corresponding to different recording areas and said selector means selects the tracking information from among said plurality of memories.

8. The apparatus according to claim 1, wherein said slant track includes an information signal area provided within said slant track, an audio signal area, a video signal area and a subcode signal area in a scanning order of a rotary head when a video signal and an audio signal are recorded and/or reproduced, and tracking of said rotary head is corrected by using the tracking information of said information signal area provided within said slant track when said audio signal area is postrecorded.

9. The apparatus according to claim 1, wherein said slant track includes an information signal area provided within said track, an audio signal area, a video signal area and a subcode signal area in a scanning order of a rotary head when a video signal and an audio signal are recorded and/or reproduced, and tracking of said rotary head is corrected by using tracking information of said information signal area is postrecorded together with said subcode signal area.

10. The apparatus according to claim 1, wherein said slant track includes an information signal area provided within said slant track, an audio signal area, a video signal area and a subcode signal area in a scanning order of a rotary head when a video signal and an audio signal are recorded and/or reproduced, and tracking of said rotary head is corrected by using tracking information of said video signal area when said subcode signal area is postrecorded.

11. An apparatus for reproducing at least one slant track of a recording medium, said slant track including a plurality of recording areas including an insert and track information area, an audio signal area, a video signal area, and a subcode area, said plurality of recording areas having recorded therein respective tracking information codes, said apparatus comprising:

reproducing means for reproducing said respective tracking information codes from said plurality of recording areas;

detecting means, in communication with said reproducing means, for detecting said respective tracking information codes recovered from said plurality of recording areas to produce therefrom tracking information associated with respective ones of said recording areas;

memory means, in communication with said detecting means, for storing said tracking information associated with said respective recording areas;

selector means, in communication with said memory means, operable during at least a postrecord mode for selecting from said memory means a particular one of the tracking information stored in said memory means as a function of those recording areas which are rewritten during said postrecord mode;

control means, in communication with said reproducing means, with said detecting means, with said memory means, and with said selector means, for correcting a tracking operation of said reproducing means in accordance with said selected tracking information; and wherein said insert and track information area includes a synchronizing block area for determining a relative positional relationship between said reproducing means and said slant track, said synchronizing block area including a plurality of sync signals associated with a corresponding plurality of numerical values.

12. An apparatus for reproducing at least one slant track of a recording medium, said slant track including a plurality of recording areas including an insert and track information area, an audio signal area, a video signal area, and a subcode area, said plurality of recording areas having recorded therein respective tracking information codes, said apparatus comprising:

reproducing means for reproducing said respective tracking information codes from said plurality of recording areas;

detecting means, in communication with said reproducing means, for detecting said respective tracking information codes recovered from said plurality of recording areas to produce therefrom tracking information associated with respective ones of said recording areas;

memory means, in communication with said detecting means, for storing said tracking information associated with said respective recording areas;

selector means, in communication with said memory means, operable during at least a postrecord mode for selecting from said memory means a particular one of the tracking information stored in said memory means as a function of those recording areas which are rewritten during said postrecord mode;

control means, in communication with said reproducing means, with said detecting means, with said memory means, and with said selector means, for correcting a tracking operation of said reproducing means in accordance with said selected tracking information; and wherein said control means corrects said tracking operation of said reproducing means in accordance with the tracking information associated with said video signal area when said subcode area is postrecorded during said postrecord mode.

13. A method of recording/reproducing at least one slant track of a recording medium, said slant track comprising a plurality of recording areas arranged in a digital video format including an insert and track information area, an audio signal area, a video signal area, and a subcode area, wherein at least one of audio signals, video signals and subcode information is recorded in respective recording areas during a postrecord mode after said recording areas are arranged in said digital video format on said recording medium, said plurality of recording areas having recorded thereon respective tracking information signal, said method comprising steps of:

reproducing said respective tracking information signal from said plurality of recording areas arranged in said digital video format;

detecting said respective tracking information signal recovered from said plurality of recording areas arranged in said digital video format for producing therefrom tracking information associated with any one of said recording areas;

storing said tracking information signal associated with said respective recording areas arranged in said digital video format;

selecting during said postrecord mode any one of the stored tracking information; and performing, during said postrecord mode, a tracking operation for recording to said any one of said recording areas of said slant track in accordance with said stored tracking information selected in said selecting step; said tracking information having been recorded in a recording area which is prior to said any one of said recording areas.

14. The method according to claim 13, wherein said tracking operation of said slant track reproducing means is corrected in accordance with the tracking information associated with said insert and track information area when said audio signal area is post recorded during said postrecorded mode.

15. The method according to claim 13, wherein said tracking operation of said slant track reproducing means is corrected in accordance with the tracking information associated with said insert and track information area when said video signal area and said subcode area are postrecorded during said postrecord mode.

16. The method according to claim 13, wherein said slant track is S-shaped due to inaccurate linearity; and said step of performing corrects said tracking operation for recording to the recording areas recorded in the postrecord mode in the S-shaped slant track.

17. The method according to claim 13, wherein said any one of the stored tracking information selected in said selecting step is in the same slant track as said any one of said recording areas.

18. The method according to claim 13, wherein said step of selecting selects the tracking information corresponding to the tracking information from a different recording area than said any one of said recording areas.

19. The method according to claim 13, wherein said storing step stores said tracking information of said recording areas to respective memories for independently memorizing the tracking information corresponding to different recording areas; and said selecting step selects the tracking information from among said memories.

20. The method according to claim 13, wherein said slant track includes an information signal area provided within said slant track, an audio signal area, a video signal area and a subcode signal area in a scanning order of a rotary head when a video signal and an audio signal are recorded and/or reproduced, wherein said step of selecting selects the tracking information of said information signal area provided within said slant track when said audio signal area is postrecorded.

21. The method according to claim 13, wherein said slant track includes an information signal area provided within said slant track, an audio signal area, a video signal area and a subcode signal area in a scanning order of a rotary head when a video signal and an audio signal are recorded and/or reproduced, and said selecting step selects the tracking information of said information signal area provided within said slant track is selected when said video signal area is postrecorded together with said subcode signal area.

22. The method according to claim 13, wherein said slant track includes an information signal area provided within said slant track, an audio signal area, a video signal area and a subcode signal area in a scanning order of a rotary head when a video signal and an audio signal are recorded and/or reproduced, and said selecting step selects the tracking information of said video signal when said subcode signal area is postrecorded.

23. A method of reproducing at least one slant track of a recording medium, said slant track comprising a plurality of recording areas including an insert and track information area, an audio signal area, a video signal area, and a subcode area, said plurality of recording areas having recorded thereon respective tracking information codes, said method comprising the steps of:

reproducing said respective tracking information codes from said plurality of recording areas;

detecting said respective tracking information codes recovered from said plurality of recording areas for producing therefrom tracking information associated with respective ones of said recording areas;

storing said tracking information codes associated with said respective recording areas;

selecting during at least a postrecord mode a particular one of the stored tracking information during said postrecord mode; and correcting a tracking operation of a slant track reproducing means in accordance with said selected tracking information; and wherein said tracking operation of said slant track reproducing means is corrected in accordance with the tracking information associated with said video signal area when said subcode area is postrecorded during said postrecord mode.

* * * * *